No. 837,834. PATENTED DEC. 4, 1906.
M. M. HERRERA.
COFFEE COOKER.
APPLICATION FILED AUG. 24, 1905.
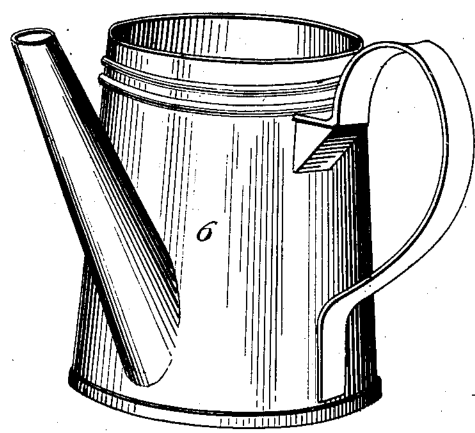
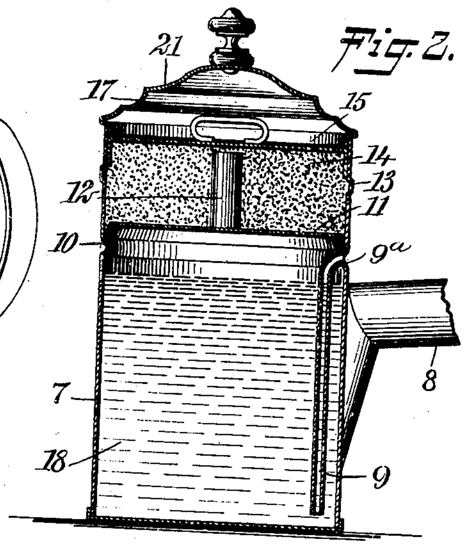
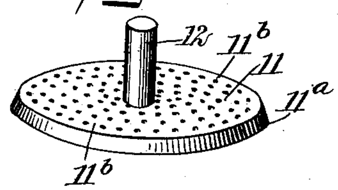
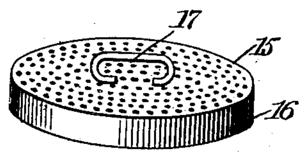
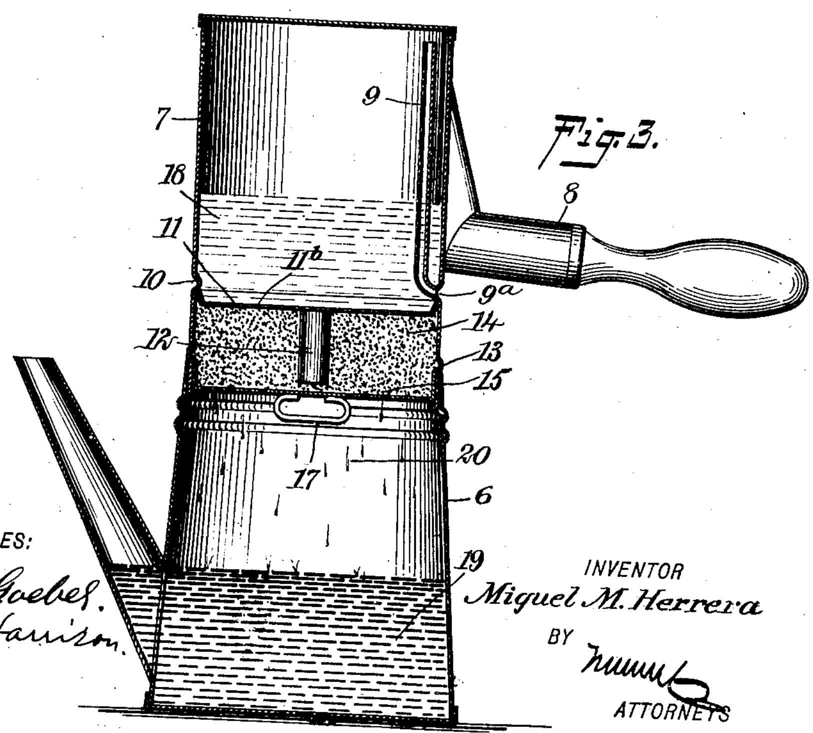
WITNESSES:
William P. Goebel.
Walton Harrison.
INVENTOR
Miguel M. Herrera
BY
Munn & Co
ATTORNEYS

UNITED STATES PATENT OFFICE.

MIGUEL M. HERRERA, OF CARACAS, VENEZUELA.

COFFEE-COOKER.

No. 837,334. Specification of Letters Patent. Patented Dec. 4, 1906.

Application filed August 24, 1905. Serial No. 275,691.

*To all whom it may concern:*

Be it known that I, MIGUEL M. HERRERA, a citizen of the Republic of Venezuela, and a resident of Caracas, Venezuela, South America, have invented a new and Improved Coffee-Cooker, of which the following is a full, clear, and exact description.

My invention relates to coffee-cookers, my more particular object being to provide a vessel to be used in connection with a coffee-pot in such manner that the ground coffee is subjected to the action of steam and allowed to become softened, so as to partially dissolve and also to permit the hot water used for this purpose to percolate through the ground coffee into the coffee-pot.

Reference is to be had to the accompanying drawings, forming a part of this specification, in which similar characters of reference indicate corresponding parts in all the figures.

Figure 1 is a perspective view of a coffee-pot to be used in connection with my invention. Fig. 2 is a vertical cross-section through the steamer used in connection with the coffee-pot. Fig. 3 is a vertical cross-section through both the steamer and the coffee-pot, showing the water as percolating through the ground coffee. Fig. 4 is a perspective view of the annular grid used as a partition within the steamer, and Fig. 5 is a perspective view of another annular grid used as a cap for the steamer.

The coffee-pot is shown at 6 and the steamer at 7, the latter being provided with a handle 8, whereby it may be inverted. Mounted within the steamer 7 is a tube 9, open at both ends and communicating with the atmosphere at the point 9ª. The steamer is provided with an annular bead 10, projecting slightly inward. A circular grid 11 is provided with a knob 12, serving as a handle, and is also provided with a cupped edge 11ª for resting upon the annular bead 10. The grid 11 is further provided with perforations 11ᵇ, as may be seen from Fig. 4. The steamer 7 is further provided with an annular bead 13 of the shape indicated in Fig. 3. When the steamer is inverted, as indicated in this figure, the bead 13 rests directly upon the upper edge of the coffee-pot 6, thus sustaining the weight of the steamer. The ground coffee to be operated upon is shown at 14 and encircles the knob 12. A cap 15 is provided with a cupped edge 16 and with a handle 17. By means of the handle 17 the cap may be fitted tightly into the steamer, as indicated in Figs. 2 and 3. The water to be operated upon is shown at 18 and the finished coffee at 19. The drops of liquid coffee percolating through the ground mass are shown at 20. A lid 21 is of appropriate size to fit over the coffee-pot 6 or over the steamer 7.

My device is used as follows: The steamer 7 is filled nearly full with the clear water 18, as indicated in Fig. 2. The grid 11 is next placed in position, the handle 12 being used for this purpose. The ground coffee 14 is then poured in and the cap 15 is forced into the upper end of the steamer, fitting tightly in position. The lid 21 is now placed upon the steamer. This lid also fits upon the coffee-pot 6 and may be transferred to the same from the steamer. The steamer being prepared as just described and as indicated in Fig. 2 is next placed upon a stove or over a gas-jet or lamp or set in a pan of hot water in order that heat may be applied. The clear water 18 soon begins to boil and steam passes upwardly through the perforated grid 11, finding its way through the ground coffee 14. The coffee is thus gradually softened a little, and its soluble parts are dissolved under the action of the steam. The operator by watching the point 9ª is able to tell from the quantity and the character of the steam when the coffee has cooked sufficiently. When this result is accomplished, he grasps the handle 8 and inverts the steamer, as indicated in Fig. 3, fitting the upper end of the steamer into the coffee-pot 6. The water 18, which by this time has received a small coloration from the essence of the coffee-grounds, owing to the condensation of steam and the drippings from the coffee-grounds, now percolates through the mass of ground coffee, as indicated in Fig. 3, in drops 20. As soon as all of the liquid passes through the ground coffee the steamer is removed and the coffee poured out of the coffee-pot 6 in the usual manner.

Having thus described my invention, I claim as new and desire to secure by Letters Patent—

In a coffee-cooker, the combination of a steamer provided with an annular bead projecting internally thereof, a perforated member detachably mounted within said steamer and engaging said annular bead, said perforated member being provided with a knob serving as a handle and also as a spacing member, another perforated member detachably mounted within said steamer and adapted to engage said knob which forms a limiting-stop therefor, a cover for said steamer, and a receptacle provided with a portion for engaging a portion of said steamer when the latter is inverted thereupon for the purpose of allowing the finished coffee to percolate thereinto.

In testimony whereof I have signed my name to this specification in the presence of two subscribing witnesses.

MIGUEL M. HERRERA.

Witnesses:
MARIANO SAUZ,
WALTON HARRISON.